United States Patent Office 3,284,231
Patented Nov. 8, 1966

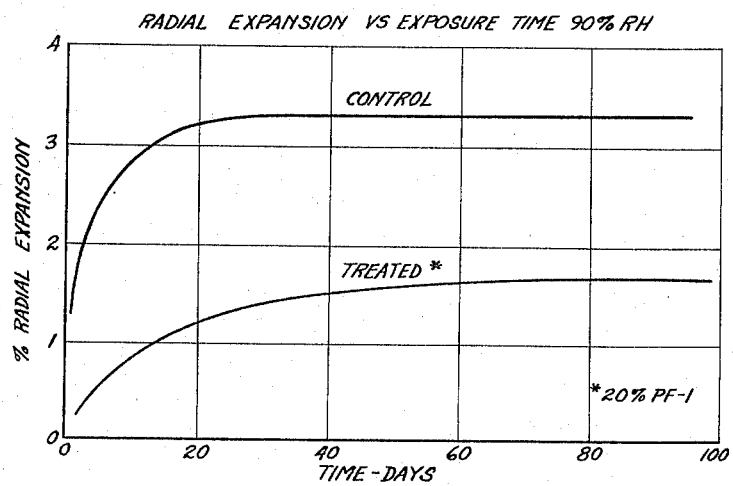
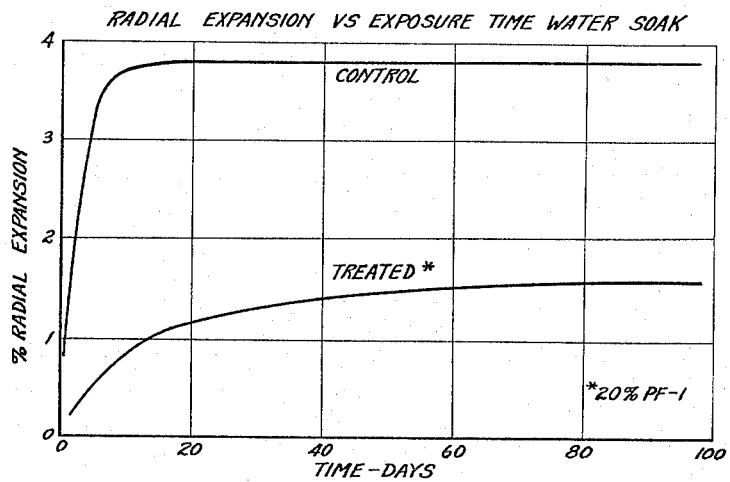

3,284,231
METHOD AND MEANS OF STABILIZING CELLULOSIC MATERIALS AND THE PRODUCTS PRODUCED THEREBY
Fraidoun Shafizadeh, Seattle, Wash., assignor to Weyerhaeuser Company, Tacoma, Wash., a corporation of Washington
Filed July 6, 1965, Ser. No. 486,579
7 Claims. (Cl. 117—118)

This is a continuation-in-part of my application Serial No. 163,699 filed January 2, 1962, now abandoned.

This invention relates to a means of and method for improving the dimensional stability of wood and wood fibers, and the improved products produced thereby.

This improvement minimizes the shrinking and swelling of wood, which are caused by fluctuations in the moisture content of the wood resulting from changes in the humidity of the ambient air or exposure to water. The moisture content of wood consists of water stored in the capillaries and microvoids of the wood, and the water absorbed by the ligno-cellulosic material of the wood fibers. These fibers can absorb water until they reach a saturation moisture content of from 18 to 33% of the dry weight of the wood. The exact figure depends on the species and a number of other factors. However, most species have a range of from 25 to 30% absorbed water in the fibers at saturation. By and large, most of this water is absorbed by the cellulosic materials which are predominantly located in the second wall of the wood cell.

Cellulose has both amorphous and crystalline regions. The crystalline regions have inter-bonded hydroxyl groups which cannot bond with water, while the amorphous regions have hydroxyl groups which are free to bond with water. Thus the absorbed water bonds to the free hydroxyl groups in both the amorphous regions of the cellulose and in other cellulosic materials, which are composed of different hemicelluloses.

This bonding or absorption of water causes the cellulosic material to swell, increasing the volume and over-all dimensions of the wood. Conversely, during dry ambient conditions, the water desorbs from the free hydroxyl group and the cellulosic material shrinks, decreasing the volume and over-all dimensions of the wood. However, the swelling or shrinking is not uniform in different directions in the wood. The swelling or shrinking is largest in the tangential direction, which corresponds to a measurement across the arc of the tree trunk, and is very small in the longitudinal direction, which corresponds to the length of the tree. The change in the radial direction, which corresponds to a distance along the radial line of the tree trunk, is usually much larger than that of the longitudinal direction and smaller than that of the tangential direction. Thus, swelling is most pronounced in the tangential and radial directions. The total of the three measurements will reflect the total volume swelling or shrinking of a tree. The grain lines found on any board will determine which measurements are pertinent for that board.

Many methods have been proposed and some are being used for decreasing both the rate and the total amount of swelling and shrinking of the wood, thereby increasing the dimensional stability of the wood.

There are several approaches to the problem.

The simplest and most widely used approach is to decrease the rate of absorption or desorption by coating the wood with a paint or a water-repellent which acts as a barrier against the penetration and flow of liquid. This approach is useful when the ambient wetting or drying conditions fluctuate only slightly from an established norm. However, a prolonged wet or dry ambient condition will cause the wood to achieve maximum swelling or maximum shrinking.

A second approach is to cause maximum swelling of the wood and then keep the wood in this swollen condition. There are several methods of doing this.

One is to replace the water by another agent that does not have a perceptible fluctuation in its equilibrium condition with the ambient medium. This material, known as a bulking agent, is deposited within the swollen structure of the wood and replaces the water. An example of a bulking agent is a phenol-formaldehyde compound that is polymerized within the wood under alkaline conditions. However, the alkaline conditions degrade the wood and make it brittle. Furthermore, the wood becomes colored with the typical color of an alkaline cured phenolic polymer, which is dark brown or black. Impregnation of wood with inert and water soluble bulking agents gives rise to problems of leaching.

Another method of retaining the wood in its swollen condition is to retain the water within the wood by the addition of humectants or salts to the wood. However, the salt or humectant merely changes the equilibrium conditions between the ambient medium and the wood, and, under more drastic ambient drying conditions, the water will still leave the wood and the wood will shrink.

A converse approach is to block the absorption of water by the wood. There are several methods used to accomplish this.

The first and simplest method is to heat the wood to drive out the retained moisture within the wood and to reduce the hygroscopicity of the wood. However, this treatment embrittles the wood and reduces its resistance to abrasion so that the increase in desirable properties is achieved at the expense of an increase in undesirable properties.

Another method is to react or substitute the free hydroxyl groups with other groups having a small tendency for absorption of water or acting as a bulking agent. Such a reaction usually requires costly chemicals or processing that make the resulting product too expensive to be competitive with other products having similar properties.

It is also possible to cross-link the cellulosic materials so as to tie adjacent molecules together and restrict their movement in relation to each other. The restriction of movement will also restrict the amount of swelling of the cellulosic material and thereby restrict the amount of absorption that it is possible for the cellulosic material to achieve. Cross-linking has been attempted with formaldehyde alone in a reaction requiring strongly acidic conditions which degrade the wood. Since this reaction is incompatible with the basic composition of the wood, any gain in dimensional stability is accompanied by a loss in other properties.

The above methods illustrate the requirements that are necessary for increasing the dimensional stability of wood without a consequent increase in undesirable features. The cost of the final dimensionally stable product must be competitive with the costs of similar end use products having a similar dimensional stability. Therefore, the materials used to achieve dimensional stability should not be costly, and the method of treatment should not be costly, and the method of treatment should not be involved nor require expensive equipment. The conditions of treatment must be compatible with the properties and the composition of wood so that other properties of the wood are not degraded. Such degradation is noted with treatments requiring pH conditions other than the normal or natural pH condition of the wood. The dimensional stability of the wood should be markedly enhanced so that a wood species may compete with more dimensionally stable wood species, or other materials which are more dimensionally stable. Lastly, the dimensional stability should be retained under all conditions of wetting or drying so that the product may be stable under a wide variety of ambient conditions. This requires that the ingredients used to make the product dimensionally stable should react either with themselves or with the wood components in a manner that will cause them to be retained within the wood so that they will not leach out of the wood or otherwise leave the wood.

These requirements eliminate treatments using strong acids, alkalies, and compelling reagents, or other conditions which result in excessive decomposition of the wood or degradation of the properties of the wood; and eliminate treatments using expensive chemicals or other materials, using materials which are difficult to introduce into cell walls, or using materials which are subject to leaching after treatment or materials which are harmful to wood and require removal or elimination of the unreacted quantities.

In other words, simple inexpensive chemicals must be used in a manner that is both simple and compatible with the composition of the wood, and within the natural pH range of the wood. The molecular structure of the chemicals must be small so that they can easily penetrate the structure of the wood, and enter the cell walls. The chemicals must react within the cell walls of the wood so that they will not leach from the wood. The wood must retain its natural appearance. The product must be competitive, both in price and in properties, with similar end use products.

It is therefore an object of this invention to provide a means of and method for economically improving the dimensional stability of wood.

It is another object of this invention to provide a means of and method for markedly improving the dimensional stability of wood.

It is a further object of this invention to provide a means of and method for improving the dimensional stability of wood without harmful degradation of other wood properties.

It is also an object of this invention to provide a means of and method for improving the dimensional stability of wood which will retain the natural appearance of the wood after the treatment.

It is a further object of this invention to provide a dimensionally stable wood product.

These and other objectives will become readily apparent upon a reading of the following specification in conjunction with the attached drawings.

FIGURE 3 is a graph showing the radial expansion over a 100-day period of treated and control samples of oven dry wood when placed in an ambient atmosphere having a 90% relative humidity.

FIGURE 4 is a graph showing the radial expansion over a 100-day period of treated and control samples of oven dry wood when water soaked.

Figure 1:
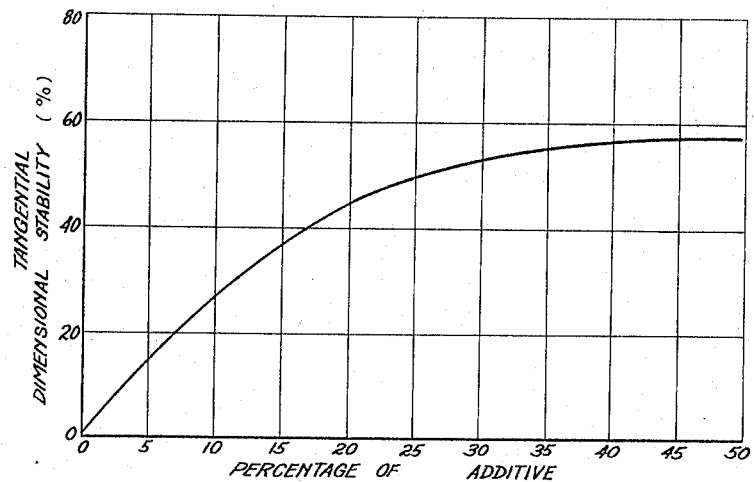
FIGURE 1 is a graph showing the increase of tangential dimensional stability of hemlock as a function of the amount of additives within the wood.

The present invention provides a bulking and cross-linking compound which meets the necessary criteria set forth above. The chemicals used are standard and inexpensive chemicals. The reaction takes place under standard lumber treating conditions, and at the pH of wood, normally from 4 to 5. The chemicals used have small molecules so that they may penetrate the wood cells easily. Evidence indicates that the chemicals react both with the cellulosic materials within the wood cell and with each other to both cross-link the molecules of cellulosic materials and to form molecules that are too large to be leached from the wood cell. Their reaction product does not color the wood. Thus, the wood retains its natural appearance, has a greatly enhanced dimensional stability, and is competitive both in cost and in quality with other similar end use materials.

These desirable results occur when the wood is treated with a solution containing from 6 to 45% by weight of methylolphenols, from 1 to 15%, and preferably 8%, by weight of free formaldehyde, and water. It is buffered to the pH of the wood to be treated by using a mild acid that is compatible with the wood at that pH. Although the exact pH of the wood will depend on the species and other factors, the pH of the wood is normally in the range of from 4 to 5. The acid used to buffer the treating solution is preferably oxalic acid although it is permissible to use other acids adjusted to similar buffer conditions. Acetic and phosphoric acids are exemplary of other acids which may be used.

Indirect evidence indicates that these chemicals reacting within the wood under these conditions cross-link with each other and with the free hydroxyl groups of the cellulosic materials to form a dimensionally stable wood product. However, it should be realized that there is no direct evidence that the following reactions do occur. There is only direct experimental evidence that both the free formaldehyde and the methylolphenols are necessary to the over-all reaction, and the pH of the wood is necessary to the over-all reactions.

It is thought that the first reaction occurs between the free formaldehyde and the cellulosic materials. In the pH range of from 4 to 5, the free formaldehyde readily reacts with the free hydroxyl groups of the cellulosic materials to form a hemiacetal derivative, as follows:

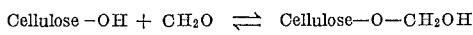

Further reactions of this hemiacetal derivative with other free hydroxyl groups of the cellulosic material to provide cross-linking of the cellulosic material, which is the same as cross-linking the cellulosic material with formaldehyde alone, take place only under drastic acid conditions which would degrade the wood. Therefore, it is necessary to provide other chemicals for the actual bridging or cross-linking of the cellulosic materials.

These chemicals are the methylolphenols that are present in the impregnating solution. The methylolphenols may react with themselves to form a number of phenol-formaldehyde condensation products.

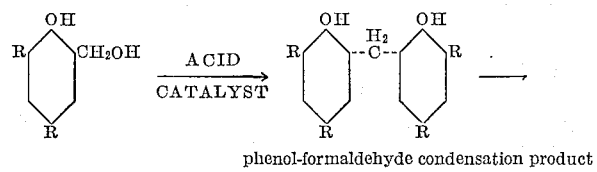

phenol-formaldehyde condensation product

The rate of reaction or speed of curing depends on the pH of the solution. At the pH conditions of 3 to 5, the reaction takes place very slowly; thus, it is possible to concentrate the solution and avoid gelling at an early stage. This is a desirable feature since, under slow drying conditions, the solution in the lumen can be concentrated without gelling and the concentrated solution may diffuse into the cell wall. If gelling takes place at an early stage, the material would not diffuse into the cell wall but would be deposited in the lumen and other voids and cavities of the wood.

Within the cell wall, both the condensation products and the methylolphenols themselves may react with the hemiacetal derivatives to link the cellulosic materials to the condensation products, and to cross-link the cellulosic materials.

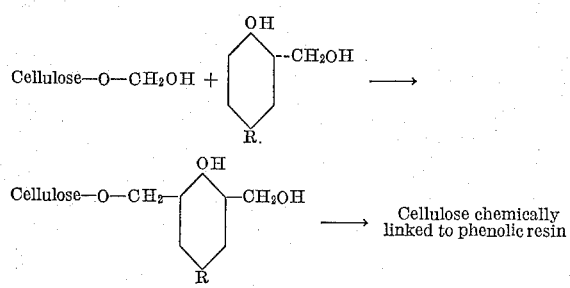

The products of the above reactions may further react with each other and with the original components to form a phenol-formaldehyde resin that is chemically linked to the cellulose.

The reaction is slow, taking place during the normal drying operation on the wood, and results in a penetration of the additives into the cell walls from the lumens and void areas surrounding these cells. As the drying gradually evaporates the water from both the wood and the solution, the solution becomes more concentrated and gradually penetrates the cell walls instead of remaining in the lumens and void areas surrounding these cells. Thus the additives actually react with the cellulosic material in the cell walls, rather than with themselves in the lumen and void areas of the wood. Evidence in the form of lack of exudation of the polymerized impregnating material on the radial and tangential surfaces of the wood appears to substantiate that the reaction occurs. The reaction product is thus tied to the wood cell and will not leach from the product.

The following examples disclose ways of making the impregnating solution:

*Example I*

1,000 grams of phenol, and 2.5 liters of 35% formaldehyde were reacted at room temperature under mild alkaline conditions, a pH of approximately pH-9. This condition was created by the addition of 100 ml. of 25% sodium hydroxide to the solution. After approximately 12 days the free formaldehyde content of the solution was reduced from 26% to about 8%.

*Example II*

4,440 grams of 90.25% aqueous phenol and 10,000 grams of 35.25% formaldehyde were reacted at room temperature at a pH of approximately pH-9. This condition was created by the addition of 400 grams of 25% aqueous sodium hydroxide to the solution. After approximately 8 days, the free formaldehyde content of the solution was reduced to 8%.

*Example III*

5,772 grams of 90.25% aqueous phenol and 10,000 grams of 46% formaldehyde were reacted at room temperature at a pH of approximately pH-8.9. This condition was created by the addition of 520 grams of 25% aqueous sodium hydroxide to the solution. After approximately 14 days the free formaldehyde content of the solution was reduced to 8.4%.

Naturally, the final ratios of free formaldehyde to methylolphenols will depend upon the reaction time, the reaction conditions and the amounts of starting material. The compositions and reaction times in a number of representative impregnating solutions are disclosed in Table I. The percentages given in Table I are based on the weight of the solution, and the ratios of methylolphenol to free formaldehyde and to combined formaldehyde are based on the weights of the ingredients. It should be noted that solutions of Examples 10 and 11 were acidified after 4 days.

TABLE I

| Example | Initial Composition Percent | | | | Aging Time, Days | Final Solution | | |
|---|---|---|---|---|---|---|---|---|
| | Phenol | Formaldehyde | Sodium Hydroxide | Water | | Free Formaldehyde, Percent | Ratio Methylolphenol to Free Formaldehyde | Ratio Methylolphenol to Combined Formaldehyde |
| 4 | 26.0 | 26.2 | 0.8 | 47.0 | 12 | 10.0 | 4.20 | 1.60 |
| 5 | 23.4 | 26.0 | 0.8 | 49.8 | 21 | 9.6 | 4.13 | 1.43 |
| 6 | 23.4 | 26.0 | 0.8 | 49.8 | 14 | 10.3 | 3.91 | 1.47 |
| 7 | 26.2 | 25.7 | 0.8 | 47.3 | 2 | 14.5 | 2.58 | 2.34 |
| 8 | 30.8 | 24.2 | 0.9 | 44.1 | 14 | 9.8 | 4.60 | 2.14 |
| 9 | 33.3 | 22.5 | 1.1 | 43.1 | 4 | 7.3 | 6.65 | 2.18 |
| 10 | 33.3 | 22.5 | 1.1 | 43.1 | 7 | 5.7 | 9.20 | 1.95 |
| 11 | 33.3 | 22.5 | 1.1 | 43.1 | 11 | 3.6 | 14.50 | 1.76 |

These solutions were then neutralized with oxalic acid, acetic acid or phosphoric acid to the pH of the wood to be treated. This pH is normally from 4 to 5, and will usually be approximately 4. The solutions were diluted further with water to a desired concentration. This final dilution determined the total concentration of free formaldehyde and the methylolphenol in the solution.

The solutions were used for treating samples of various species of wood under varying conditions, and the samples were then tested for dimensional stability. The results of some of these tests were shown in FIGURES 1 through 6.

In these tests, samples were brought to a state of moisture equilibrium, cut into two matched sections, and each of the sections was weighed and measured. One of the sections was then treated with the impregnating solution, and the other used as a control. Some of the samples to be treated were placed in a container within a desiccator, and the desiccator was evacuated for about one hour. The impregnating solution was introduced into the container and forced into the wood by atmospheric pressure. The other samples to be treated were merely immersed in the impregnating solution for varying lengths of time. Vacuum was not employed for these samples. The treated samples were then stored for approximately 2 days at room temperature, allowing time for further diffusion and distribution of the chemicals into the wood.

The treated and control samples were subsequently dried in an oven for either 2 days at a temperature of 100° C., or for 4 days at a temperature of 80° C. The samples were again weighed and measured; and the moisture content of the wood prior to treatment, the weight of the additive and the percentage of the additive were computed, using the formula Percent additives =

$$\frac{\text{Weight of additives}}{\text{Computed oven dry weight of sample}} \cdot 100$$

The end caps of paraffin which were placed on the samples during the immersion of the sample in the impregnating solution, water, and in the humidity room were removed when the sample was weighed.

It was found that there was a greater control of the additives absorbed by the wood and that a greater amount of additives could be absorbed by the wood if the vacuum technique was used. When vacuum was not used, the amount of additives absorbed by the wood would reach a maximum of less than 10% after about three minutes. In some of the tests approximately 7% additives were absorbed by the wood after one-half minute. Therefore, the length of immersion did not control the amount of additives absorbed by the wood when the non-vacuum technique was used.

It was noted that the ingredients acted at least partially as a bulking agent because the radial and tangential dimensions of the oven dry treated samples were greater than those of the oven dry control samples. The raidal dimensions of oven dry treated samples containing from 10 to 44% additives were from 2 to 3% larger than their corresponding controls. This difference was reduced to from 1 to 0.5% after the samples were allowed to attain maximum swelling because the control samples expanded more than the treated samples.

The maximum swelling was obtained by immersing the samples in water for 60 days, allowing them to come to a new moisture equilibrium. The samples were again measured, and the dimensional stability was calculated using the formula Percent Dimensional Stability =

$$\frac{\text{Expansion of control sample} - \text{Expansion of treated sample}}{\text{Expansion of control sample}} \cdot 100$$

Figure 2:
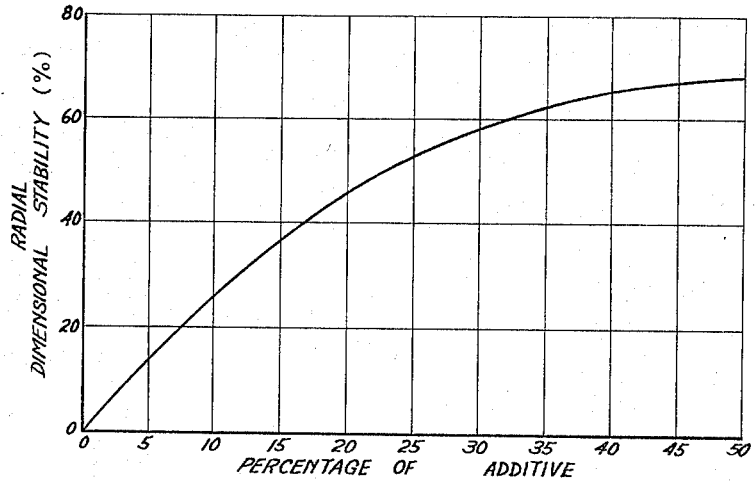
FIGURE 2 is a graph showing the increase of radial dimensional stability of hemlock as a function of the amount of additives within the wood.

It was found that the dimensional stabilities thus determined were related to the percentage of additives in the sample and, therefore, the dimensional stabilities are plotted as a function of the amount of additives in hemlock in FIGURES 1 and 2. As may be seen, the maximum stability is attained when the additives are approximately 45% of the oven dry wood by weight. However, a marked increase in dimensional stability may be attained with less additives and a concentration of about 20 weight percent of additives in hemlock will give hemlock a dimensional stability of 45%, bringing it within the stability range of cedar.

It should be noted that any given sample of any given species, may deviate from the precise curves shown in FIGURES 1 and 2 because of variables, such as density, that will be found in all woods. It has been noted that the treatment does not enhance the dimensional stability of the more dimensionally stable woods, such as cedar, as much as it enhances the stability of woods such as hemlock and ponderosa pine.

The comparison of the radial expansion over a 100-day period of oven dry hemlock containing 20 weight percent additive and oven dry untreated hemlock when placed in an atmosphere having a relative humidity of 90% and when water soaked is given in FIGURES 3 and 4.

Figure 5:
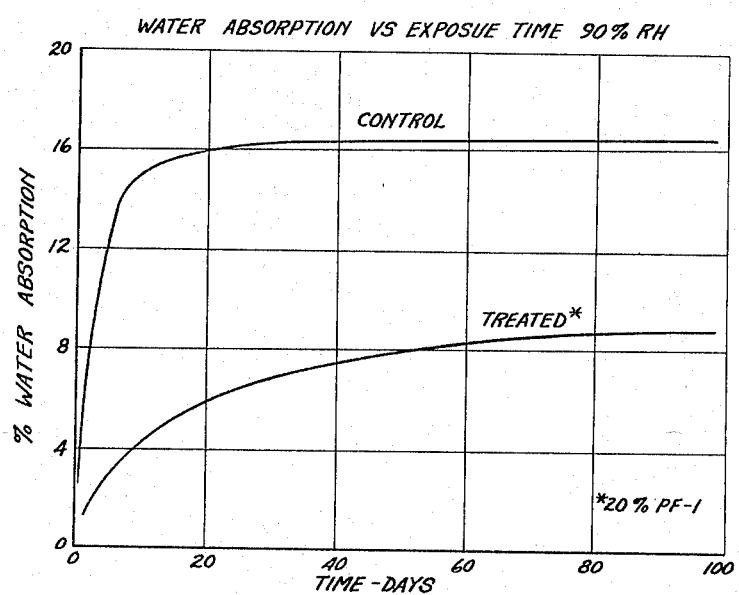
FIGURE 5 is a graph showing the percentage of water absorption of treated and control samples of oven dry wood over a 100-day period when placed in an ambient atmosphere having a 90% relative humidity.
Figure 6:
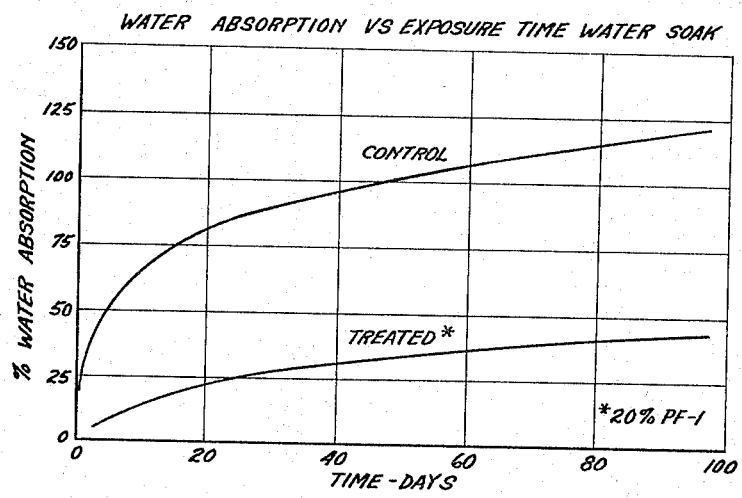
FIGURE 6 is a graph showing the percentage of water absorption of treated and control samples of oven dry wood over a 100-day period when water soaked.

Treated samples were also compared to control samples for a rate of water absorption. Two such comparisons are shown in FIGURES 5 and 6. The water absorption of oven dry hemlock containing 20 weight percent additive is compared with the water absorption of oven dry untreated hemlock both in an atmosphere having a relative humidity of 90% and when water soaked.

These figures illustrate that the rate of change for treated wood is less than for untreated wood, and that the total change for treated wood is less for treated wood than for untreated wood. The amount of change will depend upon the amount of additives in the wood—the greater the percentage of additives in the wood, the less the change in the wood. Similar curves are recorded if treated and untreated samples of wet wood are placed in a dry atmosphere. Again, the greatest change takes place during the initial portion of the test. Thus the graphs show that the present treatment provides greater dimensional stability for both daily and seasonal fluctuations in the ambient moisture conditions.

The results using any of the organic acids as a buffer medium were within the same range so that it could be assumed that the type of organic acid used for the buffering medium did not have any great effect on the dimensional stability that was attained. To test this, one group of samples was impregnated with oxalic acid alone in an amount equal to the amount used to buffer the impregnating solution. There was little difference between the untreated sample and the oxalic acid treated samples.

The samples were also tested for cupping, the tendency to curl when moistened on one side. Several samples, treated with from 16 to 55% additive, showed 80 to 100% less cupping than their corresponding controls when given a 22-hour test. This impressive resistance to cupping is believed to be due to increased stiffness as well as the dimensional stability and reduction in the water absorption rate of the treated samples.

It has been found that this process is also applicable for increasing the dimensional stability of reconstituted wood products, i.e., wood products made from wood fibers, wood flakes or wood particles or mixtures thereof by known pressing or molding operations.

Obviously, it is much simpler to impregnate small fragments of wood, such as fibers, flakes or particles, than larger pieces of wood. For reconstituted wood products it may be sufficient to spray these fragments with solution prior to forming a mat and pressing or molding the mat in a known manner. It is also permissible to spray the solution onto the mat prior to the pressing or molding operation.

The impregnating solution may also be used for treating the substrate prior to coating with a paint, varnish, lacquer or the like, by either immersing with or without vacuum, or merely by painting the surface of the substrate with the solution.

While various specific examples of preferred procedure embodying the above invention have been described above, it will be apparent that many changes and modifications may be made in those methods of procedure without departing from the spirit of the invention. It should, therefore, be understood that the examples cited and the methods of procedure set forth above are intended to be illustrative only and are not intended to limit the scope of the invention. What is claimed is:

1. A method of increasing the dimensional stability of wood comprising
    impregnating said wood with an aqueous solution consisting essentially of methylolphenols and free formaldehyde, said solution having a pH that is approximately that of the pH of the wood and a free formaldehyde content of from 1–15% of the total weight of the solution, and a methylolphenol content of from 6–45% of the weight of the solution, and
    drying said impregnated wood slowly whereby the solution will be concentrated and diffuse further into the cell walls of the wood where it may react to provide bulking and dimensional stability.

2. The process of claim 1 in which the free formaldehyde forms from 1 to 8% of the weight of the solution.

3. The process of claim 1 in which the pH of the impregnating solution is adjusted to approximately that of the wood being treated by the addition of an acid having a pH that is compatible with wood.

4. The product formed by the process of claim 1.
5. The product formed by the process of claim 3.
6. The process of claim 3 in which the acid is oxalic acid, acetic acid or phosphoric acid.
7. The product formed by the process of claim 6.

References Cited by the Examiner
UNITED STATES PATENTS

| | | | |
|---|---|---|---|
| 2,362,274 | 11/1944 | Hurst | 260—29.3 |
| 2,609,352 | 9/1952 | Kvalnes | 260—29.3 X |
| 2,629,648 | 2/1952 | Ericks. | |
| 2,819,251 | 1/1953 | Cleek et al. | 260—57 |

WILLIAM D. MARTIN, *Primary Examiner.*

T. G. DAVIS, *Assistant Examiner.*